Figure 1:
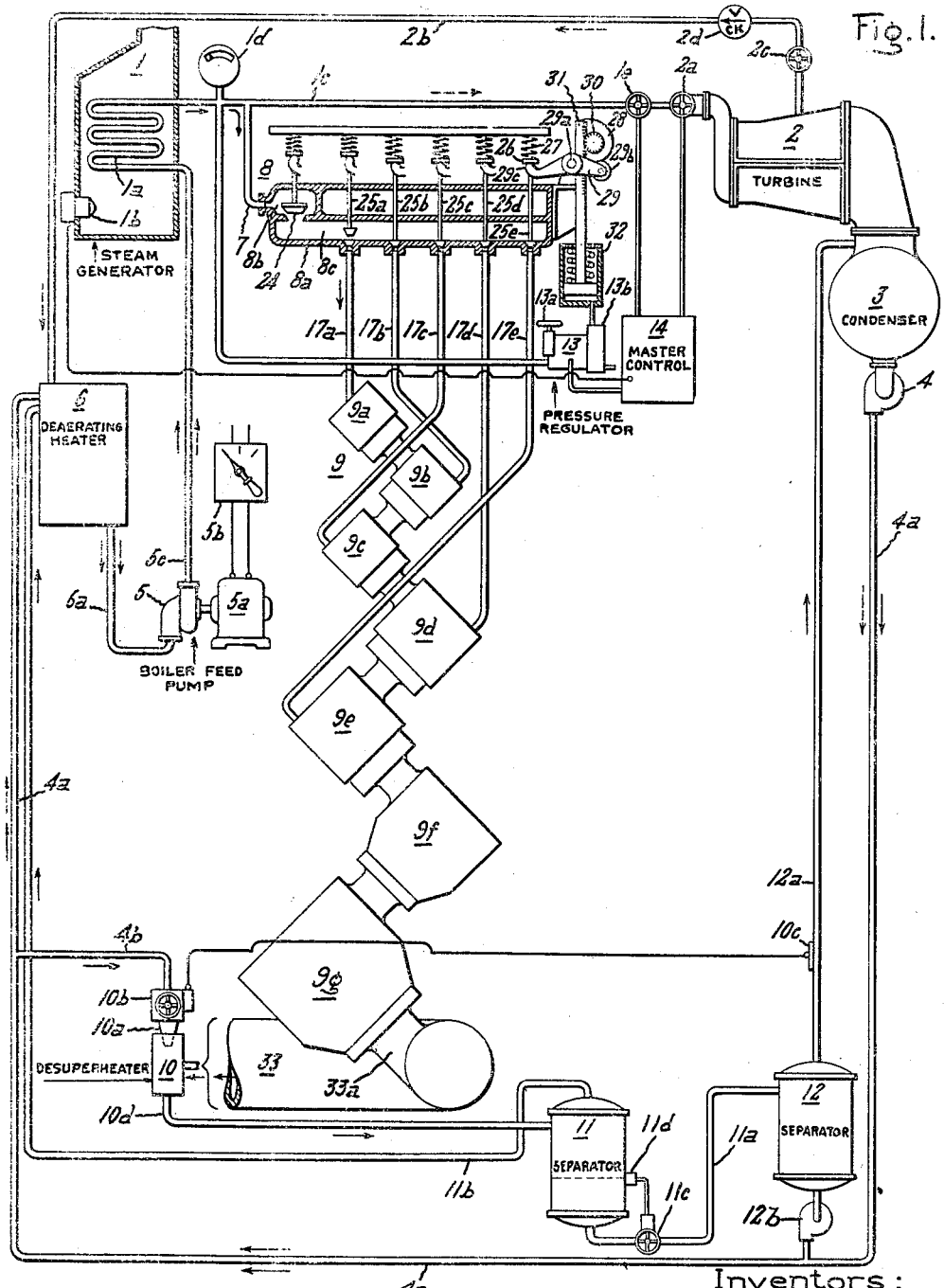

Feb. 2, 1960   H. N. CANTRELL ET AL   2,923,319
FLUID PRESSURE REDUCING APPARATUS
Filed Nov. 26, 1954   3 Sheets-Sheet 3

Inventors:
Harry N. Cantrell
Frank A. Ewing
by *Niess*
Their Attorney

United States Patent Office 2,923,319
Patented Feb. 2, 1960

2,923,319

FLUID PRESSURE REDUCING APPARATUS

Harry N. Cantrell, Ballston Lake, and Frank A. Ewing, Schenectady, N.Y., assignors to General Electric Company, a corporation of New York Application November 26, 1954, Serial No. 471,402

8 Claims. (Cl. 137—599.1)

This invention relates to apparatus for converting and dissipating the pressure energy of a volatile liquid or a gas at extremely high pressures, specifically to improved apparatus for expanding steam at super-critical pressure down to substantially atmospheric pressure. The particular application of the invention described comprises apparatus for facilitating the starting of a steam generator-turbine power plant operating with super-critical pressure motive fluid, in which process it is necessary to by-pass motive fluid around the turbine to the condenser until such time as the steam generator can be brought up to normal operating conditions.

As the size of turbine-generator units required by large electric utility generating systems has increased, there has been felt an ever greater necessity for converting the thermal energy in the fuel into electricity with the greatest possible efficiency, because of the enormous savings in fuel cost which may be effected in the course of a year by even a very small percentage increase in the thermal efficiency of the plant. This search for ever greater thermal efficiency has led to consideration of steam turbines operating with motive fluid above the "critical pressure" of water, which may be simply defined as the saturation pressure corresponding to the temperature above which there is no difference between the liquid and gaseous state of the fluid. For water, the critical temperature is 705.4° F. and the critical pressure is 3206.2 pounds per square inch absolute (p.s.i.a.).

In order to obtain a worthwhile improvement in thermal efficiency of the steam turbine power plant, it has been ascertained that it is necessary to go to pressures on the order of 3500 to 5000 p.s.i.a. Specifically, the turbine for which the invention was developed is intended to operate with steam at a pressure of 4500 p.s.i.a. and an initial temperature of 1150° F.

For operation at such extreme temperatures and pressures, it is essential that the greatest care be given to the mechanical design of the boiler and turbine and the selection of appropriate materials. Even with the best materials available, it is necessary to design the apparatus to operate extremely close to the maximum allowable limits for the various materials. Accordingly, it becomes of utmost importance to insure that proper temperature conditions, and changes thereof, be insured in the normal operation of the power plant. The starting and stopping cycles are particularly critical, from the standpoint of excessive temperature gradients which may be established in the metal parts of the turbine, with resulting tendencies to distort. Because of the close clearances to which the turbine must be manufactured, any such distortion may easily result in rubbing and severe damage to the machine.

The steam generator furnishing the motive fluid for such a high temperature high pressure plant also presents very difficult design problems. For protection of both the boiler and turbine, the control system must be so integrated that preselected safe temperature gradients will not be exceeded, particularly during starting and stopping.

To this end, it becomes necessary to provide means for bypassing motive fluid around the turbine and recirculating it through the steam generator, until the pressure and temperature of the fluid is suitable for initiating operation of the turbine. This involves means for reducing the pressure of the motive fluid from that obtaining at the outlet of the steam generator to that desired at the inlet to the generator. In the power plant for which the invention was developed, this means that approximately ¼ to ⅓ the normal rated flow from the steam generator must be recirculated through the pressure reducing device, until steam conditions leaving the generator reach 4500 pounds per square inch and 700° to 1150° F., more specifically about 800° F.

The simplest and perhaps most obvious expedient for performing this pressure reducing function would be a number of pressure reducing valves in series. However, experience shows that the wear and tear on such valves would be so extreme that they would fail in a short time. Furthermore, the very high velocities in such a system produces intolerable noise and dangerous vibration of the connected piping system. Another expedient which may be used, either alone or in combination with pressure reducing valves, is a series of restricted orifices. This is also an unsatisfactory solution because of the extreme amount of erosion which occurs due to the high velocity of the steam passing through the orifices. Furthermore, an orifice is always subject to clogging, for instance by entrained solids such as boiler compounds carried in the steam. Thus an orifice is unreliable and of comparatively short life because it is subject to reduction in effective area by clogging, and enlargement by erosion.

Such previously tried arrangements were not considered satisfactory for this power plant because of the need for handling both water and steam, and water-steam mixtures. It will be understood that steam containing a substantial amount of entrained water is particularly erosive with respect to any valves or orifice plates used in the system.

Therefore, the purpose of the invention is to provide improved apparatus for effecting an extremely large pressure drop in a fluid, without the use of small orifices subject to clogging, and with little or no erosion due to high velocity fluid contacting metal walls.

A further object is to provide pressure reducing apparatus of the type described which will be effective when the fluid is all liquid in one range of operation, or when it is all gas in another range of operation, and also when it comprises a mixture of gas and liquid in an intermediate range of operation.

Another object is to provide fluid pressure reducing apparatus which will be effective over a substantial range of volume flow rates.

A specific object is to provide means for reducing the pressure of steam from substantially above its critical pressure to a comparatively low pressure on the order of atmospheric pressure, by means of simple apparatus of the utmost reliability and freedom from deterioration through erosion, and with minimum generation of noise and vibration.

Figure 2:
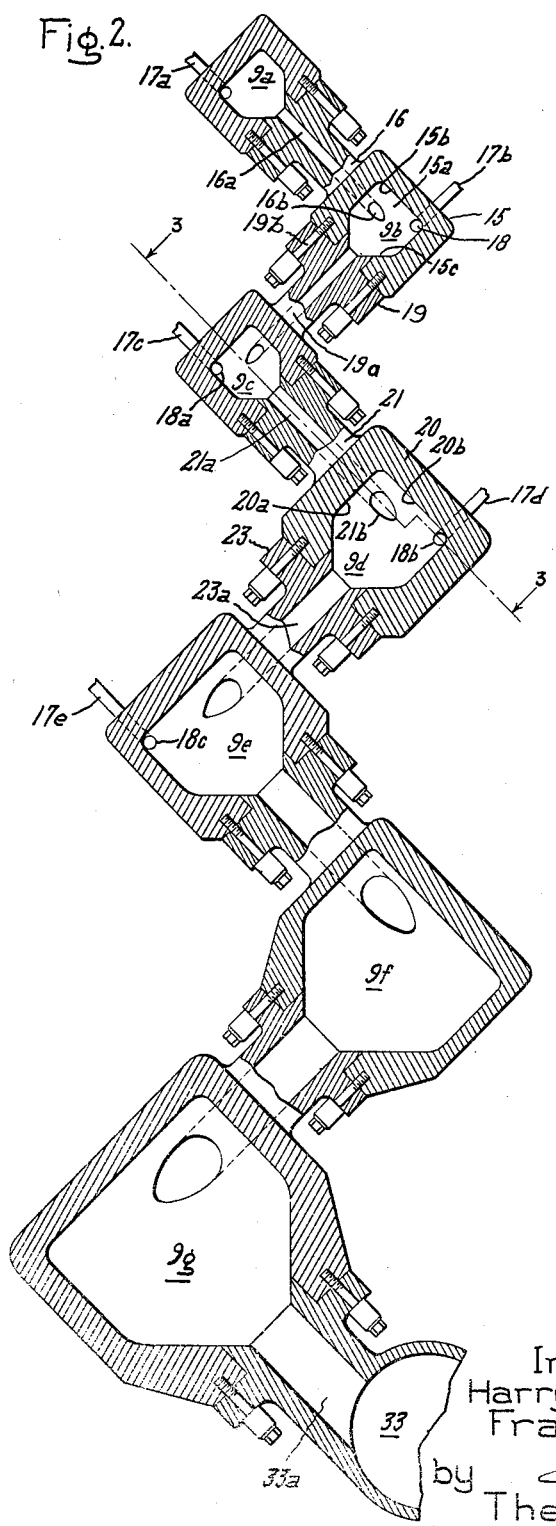
Figure 3:
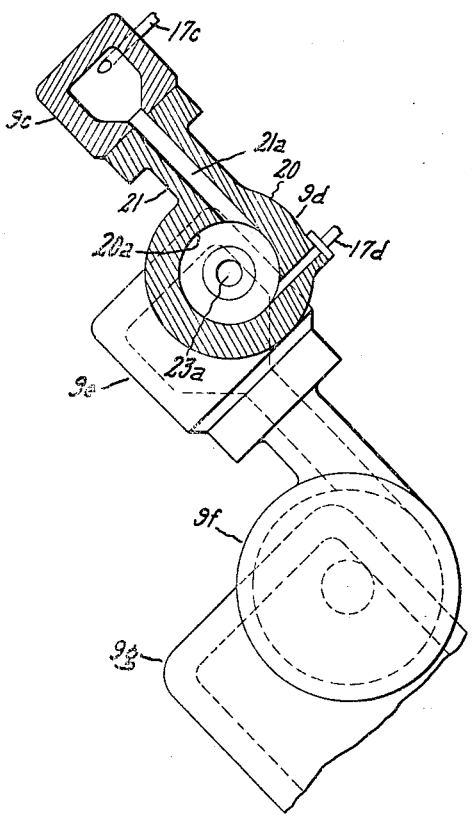
Figure 5:
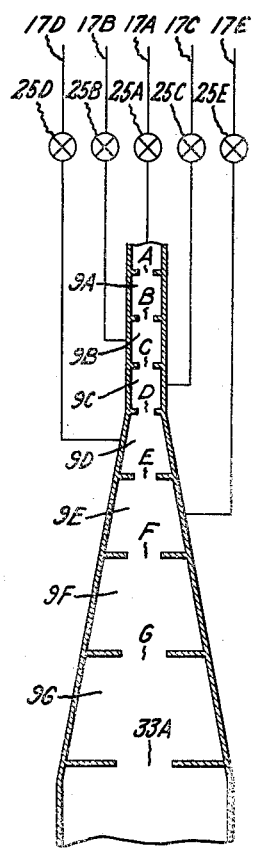
Figure 4:
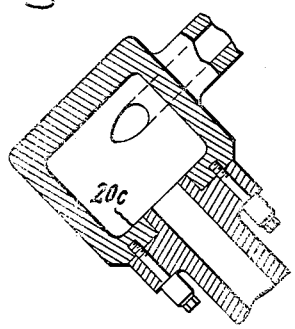

Other objects and advantages will become apparent from the following description, taken in connection with the accompanying drawings in which Fig. 1 is a circuit diagram of a steam turbine power plant, with conventional components represented more or less diagrammatically and with the pressure reducing apparatus to which the invention relates illustrated with more particularity; Fig. 2 is a detail view of the series of pressure reducing devices; Fig. 3 is a side view, partly in section, of five of the pressure reducing devices; Fig. 4 is a view in section of a modified form of a pressure reducing device; and Fig. 5 is a diagrammatic representation of a fluid analogy to the pressure reducing devices of Figs. 1–4.

Generally stated, the invention is practiced by providing a series of pressure reducing devices, each of which may be in the form of a vortex chamber, with valve means for admitting fluid at various points in the series in different portions of the operating range.

Referring now more particularly to Fig. 1, the invention is illustrated as applied to a steam turbine power plant comprising a steam generator 1 supplying motive fluid at supercritical pressure and temperature to a turbine 2 having a condenser 3. Spent motive fluid from the condenser is supplied by hot-well pump 4 to a boiler feed pump 5.

Boiler 1 is illustrated diagrammatically as comprising a "single-pass" heat exchanger 1a and a suitable fuel burner 1b. Heat exchange coil 1a is connected to the turbine by a conduit 1c provided with a pressure gage 1d and a suitable stop valve 1e.

The turbine is equipped with appropriate throttling or control valve gear 2a, and with conduit means 2b for extracting steam from a lower pressure stage, as controlled by the extraction valve 2c. Conduit 2b also contains a check valve 2d. This extraction steam is employed in the "deaerating heater" 6, in a manner which will be understood by those skilled in the art, to preheat the feedwater delivered by the boiler feed pump 5 to the steam generator. Details of the construction and arrangement of the deaerating heater are not necessary to an understanding of the present invention; and those familiar with power plant design will appreciate that the single heater 6 may actually represent a number of feedwater heaters arranged in various ways and heated by steam extracted at various points in the flow path through the turbine.

The boiler feed pump 5 is shown as driven by a variable speed electric motor 5a having speed controlling means represented at 5b. Of course, a steam or gas turbine or other suitable variable speed prime mover could be employed to drive the boiler feed pump. It is only necessary to note here that the pump is capable of furnishing water to the steam generator 1 at a variable rate of flow.

In Fig. 1, the direction of flow of the fluid in various parts of the circuit is indicated by arrows, solid arrows representing flow during the starting cycle when the pressure reducing apparatus is operative, and dotted arrows representing flow during normal operation of the turbine. It will be apparent from Fig. 1 that during normal operation the circuit is from steam generator 1 through conduit 1c to turbine 2, by way of the stop valve 1e and control valve gear 2a, from condenser 3 by way of pump 4 and conduit 4a to heater 6, thence by way of conduit 6a to boiler feed pump 5 and through conduit 5c back to the boiler 1.

In accordance with the invention, pressure reducing means are provided for bypassing steam around the turbine during the starting cycle. This bypass arrangement comprises conduit 7, a bypass control valve assembly indicated generally at 8, a series of pressure reducing vortex chambers indicated at 9, a "desuperheater" shown diagrammatically at 10, and one or more gas-liquid separators 11, 12.

The initial pressure of the steam delivered by steam generator 1 to the turbine is controlled by a pressure regulator 13; and the entire operation of the plant is integrated by a master control, indicated generally at 14 as being connected by suitable electrical or hydraulic control lines to the stop valve 1e, the turbine control valve gear 2a, pressure regulator 13, and the boiler fuel burner 1b. There may, of course, also be suitable interconnections between the master control 14 and the boiler feed pump speed selector 5b.

Referring now to the pressure reducing apparatus 9, each of the series arranged vortex chambers 9a, 9b, 9c, 9d, 9e, 9f, 9g has an internal chamber and inlet and outlet passages generally similar, as shown in more detail in Fig. 2. Referring to the device 9b, for instance, it will be seen that this vortex chamber comprises a main body portion 15 having formed integral therewith an inlet conduit portion 16. Secured by threaded fastenings 19b to the body 15 is an end closure member 19, which has formed integral therewith the discharge conduit portion 19a, which, as shown, constitutes the inlet conduit to the next succeeding vortex chamber 9c.

It will be apparent from Fig. 2 that the inlet conduit portion 16 defines a straight cylindrical passage 16a, which discharges tangentially at the port 16b into the cylindrical vortex whirl chamber 15a. It will be noted that there is no restriction in the flow path at the port 16b. That is, the inlet passage 16a is of constant cross-section area throughout, so that the velocity therein will be constant. The inlet port 16b need not be located closely adjacent the end wall 15b, but can be spaced a substantial distance therefrom, as shown. Also discharging tangentially into the vortex whirl chamber 15a is a second port 18, which communicates with the auxiliary inlet conduit 17b. Inlet port 18 is located closely adjacent the end wall 15b.

The relation of these series-arranged vortex whirl chambers will be understood better from a consideration of Fig. 3, taken in connection with Fig. 2. Here it will be more obvious how the main inlets 19a, 21a, 23a, etc. and the auxiliary inlets 17b, 17d, 17e discharge tangentially into the respective vortex chambers.

It is to be particularly noted that the first three vortex chambers 9a, 9b, 9c are exactly, or substantially, identical, with respect to shape and size of vortex chamber, inlet passage, and discharge passage (except that the discharge passage 21a of chamber 9c is substantially larger than the discharge passages of chambers 9a and 9b). On the other hand, the remaining vortex chambers 9d, 9e, 9f, 9g differ substantially. The following points of similarity and difference, as compared with the above-described vortex chamber 9b will be observed by reference to the chamber 9d. The body portion 20 defines a vortex chamber 20a which is substantially larger in diameter than the corresponding chambers in 9a, 9b, 9c. The inlet portion 21 defines a straight cylindrical inlet passage 21a which is also larger than the inlet passage 16a to chamber 9b. On the other hand, the auxiliary inlet pipe 17d and its discharge port 18b are of the same size as the corresponding elements in chamber 9b. Here also, the inlet port 21b is spaced a substantial distance axially from the end wall 20b, while the auxiliary inlet port 18b is closely adjacent the end wall 20b. It is to be particularly noted that the discharge conduit 23a formed in the end closure member 23 is a cylindrical passage of constant effective cross-section area, but substantially larger in diameter than the inlet conduit 21a.

To summarize, the vortex chambers in the first three pressure reducing devices 9a, 9b, 9c are of the same size and shape, and the connecting inlet conduits 17a, 16a, 19a are of constant effective area throughout. On the other hand, the size of the vortex chamber in the pressure reducing devices 9d, 9e, 9f, 9g progressively increases, and in each of these pressure reducers the discharge conduit is substantially larger in diameter than the inlet conduit. The significance of these relations will be seen from the description of the theory and method of operation hereinafter.

Reference may now be made again to Fig. 1 concerning the control system for directing high pressure fluid to the respective pressure reducing devices 9, and to the circuit illustrating the disposal of the low pressure fluid discharged from the series of pressure reducing devices.

The control valve assembly 8 comprises a housing 8a defining an inlet chamber 8b, and a shut-off valve 24 for admitting fluid from the inlet chamber 8b to an intermediate chamber 8c. A plurality of regulating or throttle valves 25a—25e are arranged to admit fluid from the intermediate chamber 8c into the respective conduits 17a—17e, which in turn admit motive fluid into the vortex devices 9a—9g. It will be observed by comparison of Figs. 1 and 2 that the inlet conduit 17a supplies the single inlet port in vortex chamber 9a, while the remaining conduits 17b, 17c, 17d, 17e communicate with the respective auxiliary inlet ports 18, 18a, 18b, 18c.

The actuating mechanism for the control valve assembly 8 is illustrated only diagrammatically in Fig. 1. It will be seen that each of the valves 24, 25a—25e have stems with an upper end abutment member 26 biased downwardly by a suitable spring 27. The valves are raised in the opening direction in desired sequence by a series of separate cams 28 mounted on a common cam shaft (not shown). Associated with each valve is a lever 29 supported on an intermediate fulcrum 29a with a follower 29b engaging the cam 28, while the other end has a forked portion 29c engaging the under side of the end abutment member 26.

The common cam shaft is adapted to be positioned by a pinion 30 engaged by a rack member 31 carried on the piston rod of the hydraulic servomotor 32, which is in turn controlled by the hydraulic pilot 13b associated with pressure regulator 13.

The series of cams 28 associated with the respective valves are so shaped and so oriented with respect to each other that the sequence of valve movements will be as follows. First, the stop valve 24 will open wide and remain wide open throughout all subsequent operation of the pressure reducing bypass system. After valve 24 is wide open, further movement of servomotor 32 will cause the regulating valve 25a to begin to open. Movement of servomotor 32 will progressively cause the first valve 25a to move in the opening direction; and when it has reached, or substantially reached, its maximum open position, as illustrated in Fig. 2, the second regulating valve 25b will begin to open. Likewise, when valve 25b almost reaches its wide open position, the third regulating valve 25c will begin to move in the opening position. Thus, the stop valve 24 initially admits fluid to chamber 8c and then the regulating valves 25a, 25b, 25c, 25d, 25e open in succession to admit fluid in uniformly increasing quantities to the respective supply conduits 17a—17e, each regulating valve reaching its maximum effective open position before the succeeding one begins to open.

The means for disposing of the low pressure fluid discharged from the pressure reducers and delivering it back to the boiler is as follows. As shown in Fig. 2, the last vortex device 9g has an outlet pipe 33a discharging tangentially into the conduit 33. As illustrated diagrammatically in Fig. 1, conduit 33 discharges low pressure steam into the desuperheater 10 where a spray of water from nozzle 10a reduces the temperature of the steam to a value which will not injure succeeding portions of the circuit, particularly the condenser 3. Water is supplied to nozzle 10a through conduit 4b communicating with conduit 4a, and the rate of supply of water is controlled by an automatic valve device 10b illustrated as being responsive to a detector device 10c sensing the temperature of steam flowing through conduit 12a to the condenser 3. It will be appreciated that the automatic valve device 10b injects enough water into desuperheater 10 to keep the temperature in conduit 12a at a safe value.

From the desuperheater, steam and entrained water droplets pass through conduit 10d to the separator 11, which may be any type of suitable centrifugal or vortex device for separating gas from liquid, in which the pressure may be on the order of 150 p.s.i.a. Liquid collects in the bottom of separator 11 and passes by way of conduit 11a to the second separator 12. The level of the liquid in separator 11 is maintained by a throttling valve 11c, under the control of a level sensing device 11d.

Steam is withdrawn from the top of separator 11 and passes by way of conduit 11b to the deaerating heater 6.

Water passing through valve 11c flashes into steam, because of the lower pressure (about 5 p.s.i.a.) in separator 12. Water separated from steam in separator 12 is drained by pump 12b into conduit 4a, which returns it to the heater 6. From separator 12, steam passes by way of conduit 12a to the condenser 3.

Thus, all of the steam and entrained water discharged from the last vortex device 9g is delivered eventually to the deaerating heater 6, whence it returns to the boiler feed pump 5 and back to the boiler 1.

The integrated operation of the system illustrated in Fig. 1 may be outlined briefly as follows.

With the turbine stop valve 1e closed and no fire in the boiler 1, the speed of boiler feed pump 5 is increased so that the discharge pressure rises approximately to the rated value of 4500 p.s.i.a., as indicated by pressure gage 1d. Since no heat is being added intentionally, the water is essentially "cold." It may actually be at a temperature on the order of 100° F., because of heat picked up in the high pressure boiler feed pump 5, etc.

By means of the manual adjusting device 13a, the pressure regulator 13 is set to hold the initial pressure (at gage 1d) at the desired value of 4500 p.s.i.a. If now, the boiler feed pump speed is increased still further, the pressure at gage 1d will tend to rise above 4500 p.s.i.a., with the result that regulator 13 actuates the hydraulic servo 13b to cause motor 32 to rotate the cam shaft and cause the stop valve 24 to move quickly to its wide open position, admitting high pressure fluid to chamber 8c. Since the pressure is above the set value of 4500 p.s.i.a., the servo mechanism will continue to rotate the cam shaft and open the first regulating valve 25a. This control valve will now be positioned so the inlet pressure is held at the desired value of 4500 p.s.i.a. There will be some pressure drop across the valve 25a, with the result that liquid flows through conduit 17a at a pressure which may be on the order of 3400 p.s.i.a. to the first vortex pressure reducer 9a.

The water entering the vortex chamber 9a in a tangential direction will establish a strong vortex whirl therein; and the unheated water will of course follow the laws of incompressible fluids. It will be appreciated by those acquainted with fluid mechanics that the tangential velocity at the outside of the vortex whirl, that is, that part of the liquid which is in contact with the circumferential metal walls of the vortex chamber, will be substantially equal to the velocity of the liquid entering through the supply pipe 17a, since as specified above this conduit is of constant effective area, having no restrictive nozzle at the entrance to the vortex chamber. It will also be appreciated that, in accordance with the laws governing vortex flow, the velocity will increase inversely as a function of the radius. Thus the highest tangential velocities occur at the center of the vortex chamber, where they are out of contact with the circumferential metal walls of the chamber. The strong vortex resulting will create a very substantial pressure gradient, the maximum pressure being at the greatest radius, adjacent the circumferential surface of the chamber and the minimum pressure being at the core of the vortex. It is of course the low pressure fluid adjacent the core which leaves through the exit passage 16a to the next vortex device 9b.

Thus each vortex device reduces the pressure of the fluid by establishing a strong vortex whirl, with its resulting pressure gradient, without causing fluid at the maximum acquired velocity to contact the outer circumferential wall of the device, and with the pressure energy being dissipated largely by friction within the fluid itself, rather than entirely by friction of fluid against metal surfaces.

An important advantage of thus using a vortex chamber as a pressure reducer lies in the fact that no restricted flow passages are required, as is the case where a simple orifice is used as a pressure reducer. Specifically, it is found that a vortex device designed in accordance with the invention is capable of effecting a pressure drop on the order of nine times the inlet velocity head of the fluid entering the vortex device. Thus it is possible to get from nine to twelve times as much pressure reduction from a given vortex chamber as could be obtained with a simple orifice of an effective area equal to the minimum flow path area occurring in the vortex device. Therefore, the efficiency of these vortex devices as pressure reducers is such that is possible to throttle liquid water from the initial pressure of 4500 p.s.i.a. to about 15 p.s.i.a. with four vortex devices in series. By comparison, it would take at least thirty-six simple orifices, having the same minimum flow area and flow, in series to do the same thing.

Assume now that the system of Fig. 2 is operating with the variable speed boiler feed pump 5 maintaining an inlet pressure of 4500 p.s.i.a. and the pressure regulator 13 holding the initial regulating valve 25a partly open, with cold water flowing through the pressure reducers 9. It will be found that the liquid loses most of its pressure energy in about the first three vortex devices 9a, 9b, 9c. Since the fluid is liquid throughout this process, the volume flow will remain constant, and therefore the velocity in the inlet passages of each of these three vortex devices will be constant, since they are of the same effective area. Since the temperature is not high enough to cause the water to flash into steam, this constant volume flow will pass through the larger flow areas of vortex devices 9e, 9f, 9g with a much lower velocity, giving a progressively smaller and smaller pressure drop across successive stages. The result is that practically the entire pressure drop takes place in the first three or four chambers, experiencing little further pressure drop in the progressively enlarged vortex devices 9e, 9f, 9g. With the boiler 1 and condenser 3 not operating, the final pressure in the conduit 33 may be on the order of 100 p.s.i.a., the temperature remaining about equal to the inlet temperature of 100° F.

In this operating condition, the rate of flow must be that minimum rate required to permit firing to be started in the boiler 1. This may for instance be on the order of ¼ to ⅓ the maximum rated capacity delivered by the boiler when the turbine is operating. With this rate of flow established, fuel is supplied to the burner 1b of the boiler, as dictated by the master control apparatus 14, the details of which are not important to the present invention. As soon as the boiler is fired, the temperature of the water discharged into conduit 1c begins to increase. The result is that the temperature of the fluid all through the pressure reducing devices 9 increases accordingly. Eventually the fluid leaving the last vortex device 9g reaches the saturation temperature corresponding to the local pressure existing at this point in the flow path. This means that steam will begin to form at this point, thus increasing the volume of the fluid. This increase in volume tends to produce an increase in pressure drop across the last pressure reducer 9g, which raises the pressure level all the way upstream through the pressure reducing devices 9. This causes a tendency for the inlet pressure to rise above the set value of 4500 p.s.i.a., with the result that the servo mechanism opens the control valve 25a further. Opening valve 25a reduces the pressure drop across the valve and increases the pressure of the liquid in conduit 17a, thus compensating for the increased "back-pressure" caused by the formation of steam at the outlet of chamber 9g, and keeping the weight flow through the system at the desired value.

If now the rate of firing of the boiler 1 is increased, the temperature of the liquid in conduit 1c will rise, and steam will begin forming at a point farther upstream in the pressure reducing devices 9. Soon the valve 25a reaches its wide open position, so that supply conduit 17a is incapable of handling the flow required to keep the initial pressure at the set value of 4500 p.s.i.a. The pressure regulator 13 accordingly begins to open the second regulating valve 25b. This establishes a flow path in conduit 17b parallel to that in conduit 17a, but this supplementary flow does not enter the vortex chamber 9a but enters the auxiliary port 18 of the second vortex device 9b.

Similarly, the succeeding regulating valves 25c, 25d, 25e supply liquid in parallel to the auxiliary ports 18a, 18b, 18c of the respective vortex devices 9c, 9d, 9e. As the temperature of the liquid in conduit 1c rises to the normal rated value of 1150° F., the servo mechanism successively opens the regulating valves 25c, 25d, 25e, and the point at which liquid begins to pass into steam moves progressively upstream through the pressure reducers 9.

Thus, when the boiler is supplying steam at the supercritical conditions of 4500 p.s.i.a. and 1150° F., the desired safe minimum flow of steam is bypassed through the pressure reducing devices 9 and the desuperheater 10, and separators 11, 12 and is delivered back to the inlet side of the boiler at appropriate pressure and temperature. With the desired initial steam conditions established, the master control 14 may now open the stop valve 1e and actuate the control valve gear 2a to admit motive fluid to the turbine 2. Then as the rate of flow through the turbine increases, the master control will cause regulator 13 to rotate the cam shaft and close the stop valve 24 so that, when the turbine is consuming the minimum permissible rate of flow from the boiler, the control valves 8 are closed and the pressure reducing bypass system ceases operation. To this end, the cam which operates stop valve 24 may be shaped so that valve 24 returns to fully closed position when the cam shaft rotates past the position in which all the regulating valves 25 are wide open. Still further rotation of the cam shaft may return all the regulating valves to closed position, so that the bypass control valve assembly 8 is in condition for another starting cycle.

Alternatively, the master control 14 may cause the servo mechanism 13 to effect rotation of the cams 28 in the reverse direction, so that the valves 25e, 25d, 25c, 25b, 25a, and finally the stop valve 24 close in succession. This shutting down of the bypass system may also be effected by manual actuation of the hand wheel 13a, coordinated with opening of the stop valve 1e and turbine regulating valve gear 2a. The desired criterion is to maintain the total flow from the boiler constant during this transition from bypass operation to normal turbine operation.

In connection with the bypass valve gear 8, it should be noted that, with the arrangement shown, only the stop valve 24 and the initial bypass valve 25a need to open against the full inlet pressure. The remaining bypass valves 25b, 25c, 25d, 25e each open only after there is a substantial back pressure built up at their downstream side. Furthermore, the initial valve 25a will, in ordinary operation, be caused to open quite rapidly, so that it will only for a very short time have to serve as a throttling valve. To initiate operation of the bypass system, the valve actuating gear will cause the bypass valve 25a to open almost instantaneously to effect its maximum flow through the conduit 17a. Once this initial flow is established, the remaining valves 25b, 25c, 25d, 25e will open progressively at a much slower rate, since a certain amount of time is required to bring up the temperature in the steam generator, in order that the heat exchange tubes of the generator will not be subjected to undue temperature gradients. Thus, it follows that the only bypass valve which is subjected to a substantial pressure drop thereacross (25a) will see little service as a throttling device, whereas the remaining bypass valves 25b–25e, which are required to serve as throttling valves, are never subjected to such extreme pressure drops. Thus this arrangement promotes increased reliability and long life for all the bypass valves.

The fluid mechanics theory on which this process is based may be better understood by reference to the analogous fluid system illustrated in Fig. 5, in which the series of vortex chamber 9 are replaced by an equivalent series of simple orifices. To indicate the correlation between the vortex devices of Fig. 1 and the analogous orifice system of Fig. 5, similar reference numerals have been used. The series of orifice members are identified A, B, C, D, E, F, G and 33A. The chamber formed in the flow path between orifices A and B is identified 9A and may be considered analogous to the vortex device 9a in Fig. 1. Similarly, the space between orifices B and C may be considered to represent the second vortex device 9b, and so on down the line. It may possibly be more accurate to consider orifice A, in combination with the chamber 9A in Fig. 5, to be the equivalent of the pressure reducing device 9a of Fig. 1. It is also to be noted that the outlet passage 33a in Fig. 1 really amounts to a last orifice, identified 33A in Fig. 5, since the conduit 33a discharges tangentially into the conduit 33 of Fig. 1 and therefore represents a final stage of pressure reduction.

It is to be observed in Fig. 5 that the orifices A, B, C are of identical size, whereas orifice D is slightly larger, and orifices E, F, G become progressively larger. It will be obvious that the main supply pipe 17A in Fig. 5 is equivalent to the conduit 17a in Fig. 1, and the control valve 25A in Fig. 5 represents the initial regulating valve 25a in Fig. 1. The auxiliary supply pipes 17B, 17C, 17D, and 17E with their associated valves are analogous to the elements carrying similar reference numerals in Fig. 1.

If now an incompressible liquid at very high pressure but room temperature is admitted through conduit 17A, the first orifice A will discharge a high velocity jet into chamber 9A, where the velocity energy will be dissipated through fluid friction. The liquid will then flow through the second orifice B and lose another increment of its pressure energy, through conversion to velocity energy. Since the volume rate of flow is constant throughout orifices A, B, and C, the velocity in each will also be the same, since these orifices have been stated to be of identical effective area. The number of these identical orifices is of course so selected that the liquid will lose substantially all its pressure energy. Thus when the liquid reaches the expanding portion of the flow path, beginning at the orifice D, the maximum velocity and hence the pressure drop per stage will decrease since the effective area is increasing while the volume rate of flow of the liquid remains the same.

Thus it will be seen that the function of the initial orifices A, B, C, of identical size, is to reduce the pressure of the fluid when its state is that of an incompressible liquid.

On the other hand, assume that superheated steam, or some other compressible gas, is admitted to the supply pipe 17A. As the pressure of this fluid drops, the volume occupied by the fluid increases. Thus higher and higher velocities are required to pass a constant flow through successive constant area orifices. For the same pressure drop across orifices A, B, C as in the incompressible fluid case, a much smaller mass flow will pass through these orifices. Thus more flow area is required to pass the required flow. This area is obtained by opening the bypass valves 25B, 25C. The increase in flow area in each succeeding stage is designed to be that required by the increase in volume flow accompanying the pressure drop in that stage.

Thus the expanding passage portion is designed to effect the pressure reducing function with a compressible fluid.

An important part of the problem solved by this invention resides in the method of combining the pressure reducing passage for an incompressible liquid (unheated water at 4500 p.s.i.a.) with the pressure reducing passage designed to be effective with a compressible fluid such as steam at supercritical pressures and temperatures. The solution lies in the system of bypass conduits 17. That is, when the fluid is all incompressible liquid, all of the fluid enters through the conduit 17A and experiences successive pressure drops in passing through the constant area orifices A, B, and C, the expanding orifices D, E, F, G having successively less effect on the state of the fluid. On the other hand, as the nature of the fluid changes from an incompressible liquid to a mixture of liquid and compressible gas, the orifices A, B, C, D are progressively bypassed, by admitting fluid through the auxiliary inlets 17B, 17C, 17D, with the result that the "constant area orifices" become inactive and the fluid experiences an increasing portion of its pressure drop in the "expanding orifices" E, F, G.

It is to be noted that the last bypass conduit 17E and its associated valve 25E are provided to give a margin of safety, and ordinarily will not be opened at all. Thus in all normal operation the fluid, when in its compressible or gaseous state, will be admitted to the chamber 9D so as to take advantage of the pressure-reducing effect of the orifice E.

The following points concerning the design of the fluid passages may be noted. When operating with liquid, it seems desirable that the "average through-flow velocity" be kept constant in the "non-expanding" portion of the flow path. When operating with compressible gas, the passage should be designed to obtain velocities for constant "Mach number," throughout the expanding portion of the flow path. Actually, the local velocities in the respective vortex chambers will go much higher. The criterion is constant Mach number with respect to the "through-flow" velocity in the inlet and outlet passages.

As will be appreciated by those familiar with the mechanics of vortex flow, the pressure drop obtainable in a given vortex chamber is a function of the expression $$\left(\frac{R-r_1}{r_2}\right)^2$$

where R is the radius of the vortex chamber, $r_1$ is the radius of the tangential inlet passage, and $r_2$ is the radius of the axial discharge passage. It appears desirable that the successive expanding vortex chambers be designed so that approximately the same pressure ratio is obtained across each. The design process for the expanding portion of the passage is extremely difficult, involving simultaneous solution of non-linear equations, which means that experimentation may be needed to supuplement the design calculations. An important advantage of the invention lies in the fact that the mechanical apparatus required is so simple and comparatively inexpensive to build that it is easy to make the required tests to supplement the calculations.

Certain of the design characteristics of the vortex chambers have been noted above. The axial length of the vortex chamber does not appear to be critical, but the length may for convenience be roughly equal to the diameter of the chamber, as shown in the drawings. Likewise, the length of the passages interconnecting the vortex chambers may conveniently be anywhere from five to ten times the diameter of the passage. While the precise location and manner of connection of the bypass conduits 17b, 17c, 17d, 17e to the respective pressure reducers 9b, 9c, 9d, 9e is believed not to be critical, they may conveniently be arranged to discharge tangentially into the outer circumferential portion of the vortex chambers, as illustrated in Figs. 2 and 3. It will be seen that the invention provides an improved means for throttling a high pressure fluid, which is effective whether the fluid is all in an incompressible state, or all in a compressible state, or a mixture of the two states. The pressure reducing function is effected by means of special vortex devices capable of producing a much greater pressure drop than obtainable with equivalent orifices, and without generating extremely high velocities in fluid contacting the walls of the flow path. This makes for a reduction in erosion of the parts of the apparatus, as well as for a reduction in the noise level generated by the high pressure fluid flow. Thus by using no throttling valves or orifices which are subject to clogging or erosion, the apparatus is rendered reliable and durable.

While only the one system, intended specifically for providing a pressure reducing bypass in a super-critical pressure turbine power plant, has been described specifically, it will be appreciated that the invention lends itself to certain modifications and other applications. In some cases, suitable pressure-reducing valves or simple orifices as shown in the diagrammatic analogy of Fig. 5 might be substituted for some or all of the vortex devices of Fig. 2. The details of the mechanical construction of the vortex chamber is of course subject to some variation, although that considered to be the simplest and most effective has been illustrated in Figs. 1-3. One specific design feature of the vortex whirl chamber which may be subject to some variation, is the shape of the forward end wall. In Fig. 2 this is illustrated as being a conical surface 15c, as described above. On the other hand, in Fig. 4 the end wall 20c is a flat annular surface rather than being conical. There appears to be some reason to believe that experience will show the normal surface 20c to give even better results than the conical end wall surface 15c.

Also, the number of "non-expanding" stages will depend somewhat on the initial pressure level and physical characteristics of the particular volatile liquid employed, and the overall pressure drop to be obtained. Likewise, the number of stages in the expanding portion will depend on the physical characteristics of the fluid.

It has been noted previously that the last bypass conduit 17e is merely provided as a safety factor, and may be omitted. In appropriate cases more or fewer bypass passages might be provided.

Other modifications will occur to those skilled in the art, and it is of course intended to cover by the appended claims all such changes as fall within the true spirit and scope of the invention.

What we claim as new and desire to secure by Letters Patent of the United States is:

1. Fluid pressure reducing apparatus comprising a source of fluid under pressure in substantially incompressible liquid form, a first series of pressure reducing devices connected in series flow arrangement the initial device of said series having an inlet, each of said first series having pressure reducing means of substantially the same effective area, and a second series of pressure reducing devices having pressure reducing means of successively increasing effective area, the first of said second series being connected to receive fluid discharged from the last of said first series of devices, and at least one bypass conduit connected to said fluid source and having valve means to admit additional fluid under pressure to a portion of the flow path in said first series of pressure reducing means at a location downstream from the initial pressure reducing device.

2. In pressure reducing apparatus, the combination of a source of volatile liquid at initial pressure and temperature conditions under which the fluid contains no substantial percentage of compressible gaseous components, a first series of pressure reducing devices, the first device having an inlet and each of said first series having pressure reducing means of substantially the same effective area, a second series of pressure reducing devices, the first of said second series having an inlet receiving fluid discharged from the last of said first series, each of said second series having pressure reducing means of successively increasing effective area, first conduit means connected to said source of liquid under pressure and connected to supply liquid to the inlet of said first series of pressure reducing devices, and at least one bypass conduit connected to said source of liquid and having valve means to admit additional fluid under pressure to a portion of the flow path of said first series downstream from the first pressure reducing device thereof.

3. In pressure-reducing apparatus, the combination of a source of fluid at extremely high pressures and substantially in an incompressible liquid state, a plurality of pressure reducing devices connected in series flow arrangement, each comprising walls defining a cylindrical vortex chamber and having an inlet port disposed to discharge fluid tangentially into the outer circumferential portion of the vortex chamber and walls defining a straight cylindrical discharge passage disposed axially and communicating with one end of the chamber, said inlet and discharge passages being of substantially smaller diameter than the respective vortex chambers, a plurality of said pressure reducing devices nearest the fluid source comprising a first series having substantially equal effective areas and the remainder of the devices comprising a second series of successively larger effective area, inlet conduit means connecting said fluid source to the inlet port of the first device of the first series, and at least one bypass conduit connected to said fluid source and having valve means and connected to admit additional fluid under pressure to a port discharging tangentially into the vortex chamber of a pressure reducing device of said first series downstream from the first device of said first series.

4. In pressure-reducing apparatus, the combination of a source of volatile liquid at initial conditions under which the fluid is substantially in the incompressible liquid state, a plurality of pressure reducing devices connected in series flow arrangement, each comprising walls defining a cylindrical vortex chamber with a wall portion defining an inlet port disposed to discharge fluid tangentially into the outer circumferential portion of the vortex chamber and walls defining a straight cylindrical discharge passage disposed axially and communicating with one end of the vortex chamber, the inlet and discharge passages both being of substantially smaller diameter than the respective vortex chambers, a plurality of said pressure reducing devices at the inlet portion of the series having substantially equal effective areas and the remainder of the pressure reducing devices being of successively larger effective area, inlet conduit means connected to said source of liquid under pressure and to the inlet port of the first device, and at least one bypass conduit connected to said fluid source and having valve means for admitting additional fluid under pressure to a port discharging tangentially into the vortex chamber of a pressure reducing device downstream from the first device and upstream from the expanding series of devices.

5. Fluid pressure reducing apparatus in accordance with claim 4 and including a plurality of bypass conduits, each connected to supply fluid from the source of pressure fluid to a port discharging tangentially into the vortex chamber of a different pressure reducing device downstream from the first of the series of devices, separate valve means associated with said respective bypass conduits, and means for opening said valves in sequence to progressively admit additional pressure fluid through a first bypass conduit into the vortex chamber of a second pressure reducing device downstream from the first device, then to progressively admit additional fluid under pressure through a second bypass conduit to the vortex chamber of a third pressure reducing device downstream from said second device.

6. In pressure-reducing apparatus, the combination of a source of volatile liquid at initial conditions of temperature and pressure under which the fluid is substantially in the incompressible liquid state, a series of pressure reducing devices, each comprising walls defining a cylindrical vortex chamber with a wall portion defining an inlet port disposed to discharge fluid tangentially into the vortex chamber, and walls defining a straight cylindrical discharge passage disposed axially and communicating with one end of the vortex chamber, each discharge passage comprising the inlet passage to the inlet port of the next succeeding vortex chamber, said pressure reducing devices including a first series of devices adjacent the inlet end with equal effective areas and a second series having progressively larger effective areas, inlet conduit means connected to said source of fluid under pressure and connected to supply fluid to the inlet port of the first device of said first series, a first bypass conduit connected to discharge additional fluid from said source through an auxiliary inlet port tangentially into the vortex chamber of a second pressure reducing device downstream from said first device, second bypass conduit means connected to discharge additional fluid from said source through an auxiliary inlet port tangentially into the vortex chamber of a third pressure reducing device downstream from said second device, separate valve means associated with said respective bypass conduits, and means for opening the bypass valve in the first bypass conduit progressively to substantially wide open position and then progressively to open said second bypass valve.

7. In pressure-reducing apparatus, the combination of a source of water at initial conditions above the critical pressure and temperature thereof, a series of pressure reducing devices, each comprising walls defining a cylindrical vortex chamber with a portion defining an inlet port for discharging fluid tangentially at high velocity into the vortex chamber, walls defining a cylindrical discharge passage disposed axially and communicating with the central portion of one end of the vortex chamber, both the inlet and outlet passages being substantially smaller in diameter than the vortex chamber and each discharge passage comprising the inlet passage to the inlet port of the next downstream vortex chamber, a plurality of the pressure reducing devices adjacent the inlet end of the series having equal effective areas while the remainder of the devices have progressively larger effective areas, inlet conduit means connected to said source of water at super-critical pressure and temperature and to the inlet port of the first device of the series, a plurality of bypass conduits each connected to discharge additional fluid under pressure from said source through an auxiliary inlet port tangentially into a separate vortex chamber of one of the devices of equal effective area, valve means associated with said respective bypass conduits, and means for actuating said bypass valve means whereby additional fluid is first admitted from said source through a bypass conduit to a second vortex chamber downstream from the first chamber, and then additional fluid is admitted to vortex chambers progressively downstream from said second chamber.

8. In pressure-reducing apparatus, the combination of a source of liquid at initial conditions above the critical pressure and temperature thereof, a plurality of fluid pressure reducing devices connected in series flow relation, inlet conduit means connected to said source of fluid at super-critical pressure and temperature and to the inlet port of the first device in the series, a plurality of the devices adjacent the inlet end of the series having equal effective areas while the remainder of the devices have progressively larger effective areas, a first bypass conduit connected to said source and having valve means connected to discharge additional fluid under pressure through an auxiliary inlet port into a second device located downstream from said first device, a second bypass conduit connected to said source and having valve means connected to discharge additional fluid under pressure through an auxiliary inlet port into a third device downstream from said second device, and means for actuating said bypass conduit valve means in sequence to admit fluid first through said first bypass conduit to said second device and subsequently to admit fluid also through said second bypass conduit to said third device.

References Cited in the file of this patent

UNITED STATES PATENTS

| 1,517,598 | Stevenson | Dec. 2, 1924 |
| 1,697,341 | Campbell | Jan. 1, 1929 |
| 1,833,824 | Campbell | Nov. 24, 1931 |
| 1,863,068 | Pippy | June 14, 1932 |
| 2,139,736 | Durham | Dec. 13, 1938 |
| 2,581,168 | Bramley | Jan. 1, 1952 |